(12) United States Patent
Yavid et al.

(10) Patent No.: US 7,204,424 B2
(45) Date of Patent: Apr. 17, 2007

(54) RETRO-REFLECTIVE SCANNER HAVING EXIT WINDOW WITH POSITIVE OPTICAL POWER

(75) Inventors: Dmitriy Yavid, Stony Brook, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 14 days.

(21) Appl. No.: 11/140,724

(22) Filed: May 31, 2005

(65) Prior Publication Data

US 2006/0266839 A1 Nov. 30, 2006

(51) Int. Cl.
*G06K 7/10* (2006.01)

(52) U.S. Cl. .......................... 235/462.32; 235/462.36; 235/462.43; 235/462.45

(58) Field of Classification Search ........... 235/462.01, 235/462.32, 462.36, 462.37, 462.43, 462.45, 235/472.01

See application file for complete search history.

(56) References Cited

U.S. PATENT DOCUMENTS

| | | | | |
|---|---|---|---|---|
| 5,440,111 A | * | 8/1995 | Eastman et al. | 235/462.36 |
| 5,572,007 A | * | 11/1996 | Aragon et al. | 235/462.35 |
| 5,629,510 A | * | 5/1997 | Quinn et al. | 235/462.36 |
| 5,723,859 A | * | 3/1998 | Kerschner et al. | 250/234 |
| 6,360,949 B1 | * | 3/2002 | Shepard et al. | 235/462.43 |
| 6,612,496 B1 | * | 9/2003 | Barkan et al. | 235/462.22 |
| 7,063,259 B2 | * | 6/2006 | Oliva | 235/454 |

* cited by examiner

*Primary Examiner*—Thien M. Le
*Assistant Examiner*—April A. Taylor
(74) *Attorney, Agent, or Firm*—Tarolli, Sundheim, Covell & Tummino, LLP

(57) ABSTRACT

A portable electo-optical scanner for reading a target bar code having a plurality of bar code elements. The portable scanner includes: a housing supporting a scanning module and an exit window. The scanning module scans the target bar code with a scanning beam and collecting reflected light returning from the bar code. The scanning module includes: a beam source emitting a scanning beam; photodetector circuitry; and a retro-reflective oscillating mirror including a light collection mirror and an integral scanning or beam directing mirror. The scanning mirror is positioned to intersect the scanning beam and direct the scanning beam through the exit window. Oscillation of the oscillating mirror causes the scanning beam to be repetitively scanned along a scanning direction across the target bar code. The light collection mirror has a field of view that follows the scanning beam. The light collection mirror receives reflected light from the target bar code and directs the reflected light toward the photodetector circuitry. The exit window comprises a lens having a positive optical power with respect to the scanning direction.

18 Claims, 4 Drawing Sheets

RETRO-REFLECTIVE SCANNER HAVING EXIT WINDOW WITH POSITIVE OPTICAL POWER

FIELD OF THE INVENTION

The present invention relates to an electro-optical scanner for reading bar codes and, more particularly, to a retro-reflective scanner including an exit window having a positive optical power.

BACKGROUND OF THE INVENTION

Electro-optical scanners are widely used for reading bar codes, including one dimensional and two dimensional bar codes. A scanner typically includes a scanning module which: generates a scanning beam; repetitively directs and scans the beam across a target object, such as a bar code; receives reflected light from the target object; and digitizes and decodes the reflected light to decode the information encoded in the bar code. The scanning module is supported in a housing of the hand held portable scanner which also supports a power supply and other electronics of the scanner.

The scanning module scanning beam (typically a laser beam emitted by a laser diode) is directed at an oscillating scanning mirror. The oscillating scanning mirror, in turn, directs the beam outwardly through an exit window of the scanner. The oscillation of the oscillating reflector causes the beam to oscillate across a target object such as a bar code to be read. Essentially, the beam generates a beam spot that repetitively moves across or scans the bar code.

The light-colored or space elements of the bar code reflect the laser beam illumination and the dark or black bar elements of the bar code absorb the laser beam. Reflected light from the target bar code is received by a second reflective surface, such as a collection mirror, and directed toward photodetector circuitry, such as a photodiode. The pattern of reflected light, as received by the photodiode of the scanning module, is a representation of the pattern of the bar code. That is, a sequence of time when the photodiode is receiving reflected light represents the laser beam spot moving across a space of the bar code, while a sequence of time when the photodiode is not receiving reflected light represents the laser moving across a dark bar. Since the scanning speed or velocity of the reciprocating movement of the laser is known, the elapsed time of the photodiode receiving reflected light can be converted into a width of a bar code element corresponding to a space, while the elapsed time of the photodiode not receiving reflected light can be converted into a width of a bar code element corresponding to a bar.

The photodiode is part of photodetector circuitry which converts the reflected light into an analog signal. The scanning module includes an A/D converter or digitizer to digitize the analog signal generated by the photodiode. The digitizer outputs a digital bar code pattern (DPB) signal representative of the bar code pattern. A decoder of the scanning module inputs the DPB signal and decodes the bar code. The decoded bar code typically includes payload information about the product that the bar code is affixed to. Upon successful decoding of the scanned bar code, the scanner may provide an audio and/or visual signal to an operator of the scanner to indicate a successful read and decode of the bar code. The scanner typically includes a display to display payload information to the operator and a memory to store information decoded from the bar code.

One type of electro-optical scanner, referred to as a retro-reflective scanner, employs retro-reflective light collection. In a retro-reflective scanner, the scanning module includes a mirror that both: 1) directs the laser beam toward the target bar code or another mirror; and 2) receives reflected light from target bar code and directs it toward the photosensor circuitry. An example of such a retro-reflective scanner is disclosed in U.S. Pat. No. 6,360,949 to Shepard et al., assigned to the assignee of the present invention. The '949 patent is incorporated herein in its entirety by reference.

As size considerations are extremely important in portable, hand held scanners, what is needed is a retro-reflective electro-optical scanner that provides for reduced size of scanning module components, specifically the light collection mirror, while maintaining the ability to read wide bar codes.

SUMMARY OF THE INVENTION

The present invention is directed to a portable electo-optical scanner for reading a target bar code having a plurality of bar code elements. The portable scanner includes a housing supporting a scanning module for electro-optically reading the target bar code by the bar code with a scanning beam and collecting reflected light returning from the bar code. The scanning beam and the reflected light pass through an exit window supported by the housing. The scanning module includes a beam source, a retro-reflective light collecting mirror and photodetector circuitry. The beam source emits a scanning beam. The scanning beam is repetitively scanned across the target bar code by beam directing apparatus. The light collection mirror has a field of view that follows the scanning beam as it moves along the scanning direction. The light collection mirror receives reflected light from the target bar code and directs the reflected light toward the photodetector circuitry. At least a portion of the exit window comprises a lens having a positive optical power with respect to the scanning direction.

In one embodiment, the light collection mirror is an oscillating mirror which includes an integral scanning or beam directing mirror. The beam directing mirror is part of the beam directing apparatus and is positioned to intersect the scanning beam and direct the scanning beam through the exit window. Oscillation of the oscillating mirror causes the beam directing mirror to pivot thereby repetitively scanning the beam along a scanning direction across the target bar code.

These and other objects, advantages, and features of the exemplary embodiment of the invention are described in detail in conjunction with the accompanying drawings.

DETAILED DESCRIPTION

Figure 1:
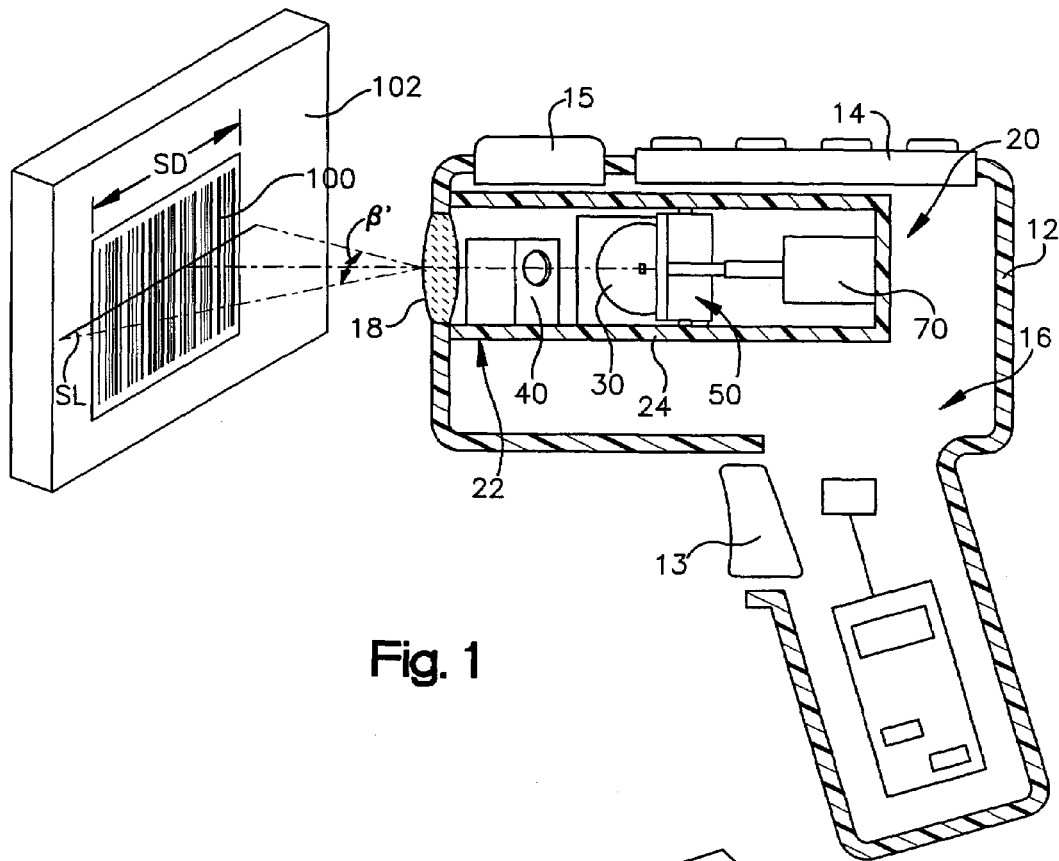
FIG. 1 is schematic view, partly in section and partly in front elevation, of an electro-optical retro-reflective scanner of the present invention.
Figure 3:
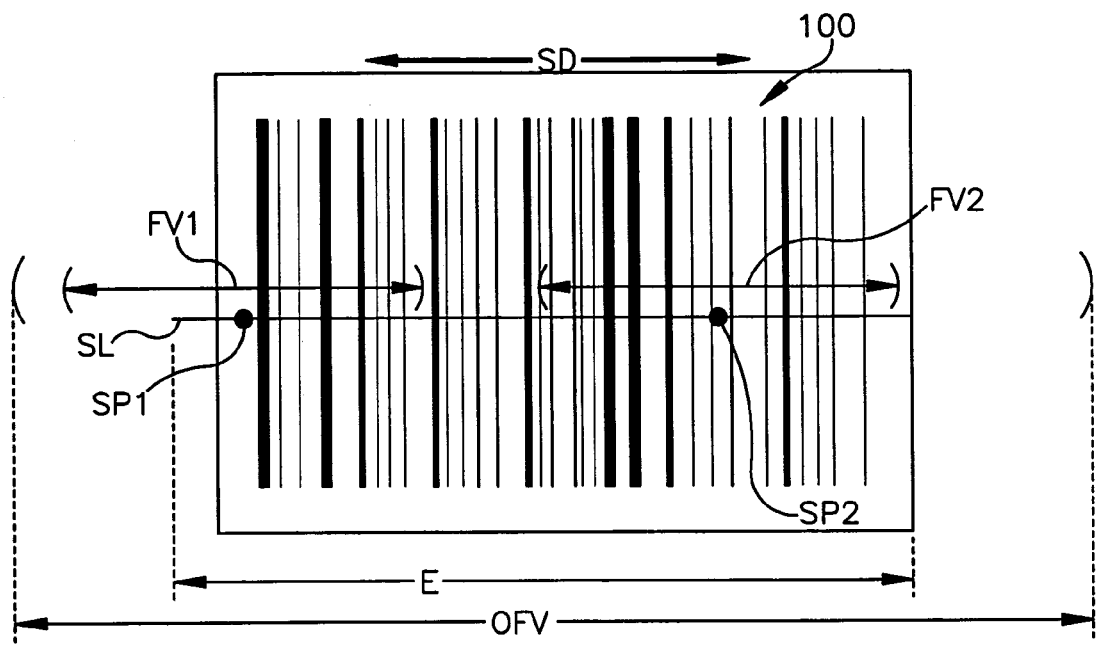
FIG. 3 is depiction of a one dimensional (1D) bar code showing representations of the scan line and field of view of the scanner of FIG. 1.

A portable electro-optical scanner of the present invention is shown schematically at 10 in FIG. 1. The scanner 10 may be used to scan and decode bar codes, such as, 1D and 2D bar codes and postal codes. As used herein, the term "bar code" is intended to be broadly construed to cover not only bar code symbol patterns comprised of alternating bars and spaces, but also other graphic patterns, such as dot or matrix array patterns and, more generally, indicia having portions of different light reflectivity or surface characteristics that result in contrasting detected signal characteristics that can be used for encoding information and can be scanned and decoded with the scanner 10. FIGS. 1 and 3 depict a target 1D bar code 100 affixed to a product 102.

In one preferred embodiment of the present invention, the scanner 10 is a hand held, portable bar code reader. The scanner 10 is supported in a housing 12 that can be carried and used by a user walking or riding through a store, warehouse or plant for reading bar codes for stocking and inventory control purposes.

However, it should be recognized that scanner 10 of the present invention may be embodied in a stationary scanner. It is the intent of the present invention to encompass all such scanners.

The scanner 10 includes an actuation trigger 13, a set of user input keys 14 and a visual display 15 for displaying decoded and/or other information. A speaker (not shown) providing an audio output to a user of the scanner 10 upon successful scanning and decoding of the target bar code 100 may also be provided. Also provided are data communications ports (not shown) and/or an rf transceiver (not shown) for uploading and downloading information to a remote computer system. The actuation trigger 13, input keys 14, display 15 and other input/output components are coupled to the circuitry 16 supported in the housing 12. The housing 12 also supports an exit window 18 though which a scanning beam is directed outwardly and which reflected light from the target bar code 100 is received. Advantageously, as will be further discussed below, the exit window 18 comprises a lens having a positive optical power.

The scanner circuitry 16, which operates under the control of one or more microprocessors, includes a retro-reflective scanning module 20. The scanning module 20 is supported by a housing 22 which includes a printed circuit board base 24. The scanning module 20 includes a laser diode assembly 30 for producing a scanning beam, photodetector circuitry 40 for receiving light reflected from the target bar code 100 and converting the light to an analog signal representative of the pattern of dark bars and light spaces of the bar code 100. The analog signal output by the photodetector circuitry 40 is digitized and decoded by an A/D converter and decoding circuitry, which are part of the scanner circuitry 16.

The scanning module 20 also includes a retro-reflective optical element or mirror 50 which is oscillated by a drive mechanism 70 about an axis A—A (FIG. 8) through an arc or scanning rotation angle β. The retro-reflective mirror 50 includes a concave light collection mirror 52 and a planar scanning or beam reflecting mirror 54 extending outwardly from a central portion of the mirror 50. As can best be seen in FIG. 9, the beam reflecting mirror 54 is offset from but vertically parallel with the pivot axis A—A such that when the mirror 50 pivots, the beam reflecting mirror 54 always intersects the beam line BL1 generated by the laser diode assembly 30.

Preferably, the mirror 50 is a single piece of molded plastic. Alternatively, the mirror 50 may fabricated of two separate pieces of plastic and/or glass which are affixed together to form the integral mirror 50, including the light collection mirror 52 and the beam directing mirror 54. While the beam directing mirror 54 is shown in the Figures as protruding outwardly from a central portion the concave surface of the light collecting mirror 52 and having a planar surface, it should be understood that other designs are possible. The beam directing mirror 54 may be formed as an indentation in the light collecting mirror 54 or may be cylindrical, spherical, toroidal, etc. depending upon the desired shaping of the reflected, outgoing beam line (labeled BL2 in FIGS. 2 and 9).

Figure 2:
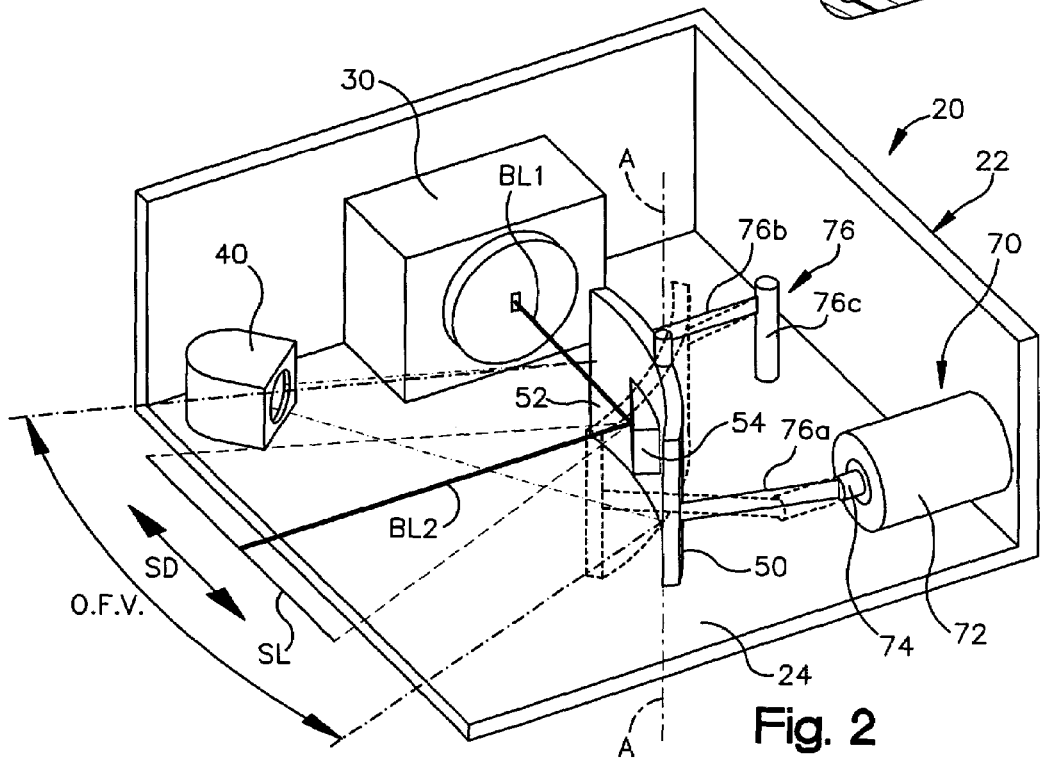
FIG. 2 is a schematic perspective view of a scanning module of the scanner of FIG. 1.

The laser diode assembly 30 is affixed to the printed circuit board 24. The assembly 30 includes a laser diode and focusing optics which generate a scanning beam line BL1 that is directed at the beam reflecting mirror 52, the beam line BL1 is reflected and redirected by the beam reflecting mirror 54. The reflected beam line BL2 is repetitively scanned forming a linear scan line SL. A direction of the scan line SL as it exits the scanner 10 will be referred to as the scan direction SD, as shown in FIGS. 2 and 3. A length or extent E of the scan line SL is determined by the scanning angle β of the mirror 50 and the optical characteristics of the exit window 18. The repetitively scanning beam line BL2 forms a generally pie-shaped scanning plane emanating from the beam-directing mirror 54. The exact shape of the scanning plane is determined by the scanning angle β and the optical characteristics of the exit window 18.

Figure 5:
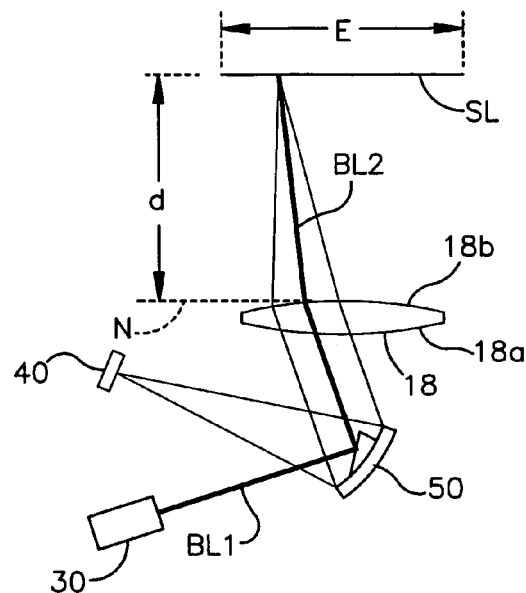
FIG. 5 is a schematic depiction of a portion of the scanner of FIG. 1 having a first preferred embodiment of an exit window lens.

The light collecting mirror 52 has a field of view that is determined by the concavity of the mirror 52 and the optical characteristics of the exit window 18. Advantageously, the positive optical power of the exit window 18 permits reduction in size of the light collecting mirror 52 while a length of the scan line SL near a nose end N (FIG. 5) of the scanner 10 is sufficient to enable reading of wide bar target bar codes.

Since the light collecting mirror 52 and beam directing mirror 54 are integral the field of view of the light collecting mirror 52 moves with and follows the beam line BL2 as is repetitively scanned across the target bar code 100. This is best illustrated in FIG. 2. When the beam line BL2 is at the point labeled beam spot SP1 in FIG. 3, the field of view of the light collecting mirror 52 is representatively shown as FV1. As can be seen field of view FV1 surrounds beam spot SP1. When the beam line BL2 moves along the scan line SL the field of view of the light collecting mirror 52 moves congruently. For example, when the beam line BL2 moves to the point labeled beam spot SP2, the field of view of the light collecting mirror 52 is shown as FV2. The extent of the field of view of the light collecting mirror 52 is shown schematically by OFV (overall field of view) in FIG. 3. As the retro-reflective mirror 50 pivots back and forth through angle β, the concave curvature of the light focusing mirror 52 causes the reflected light from the field of view to be directed toward a photodiode of the photodetector circuitry 40.

Figure 8:
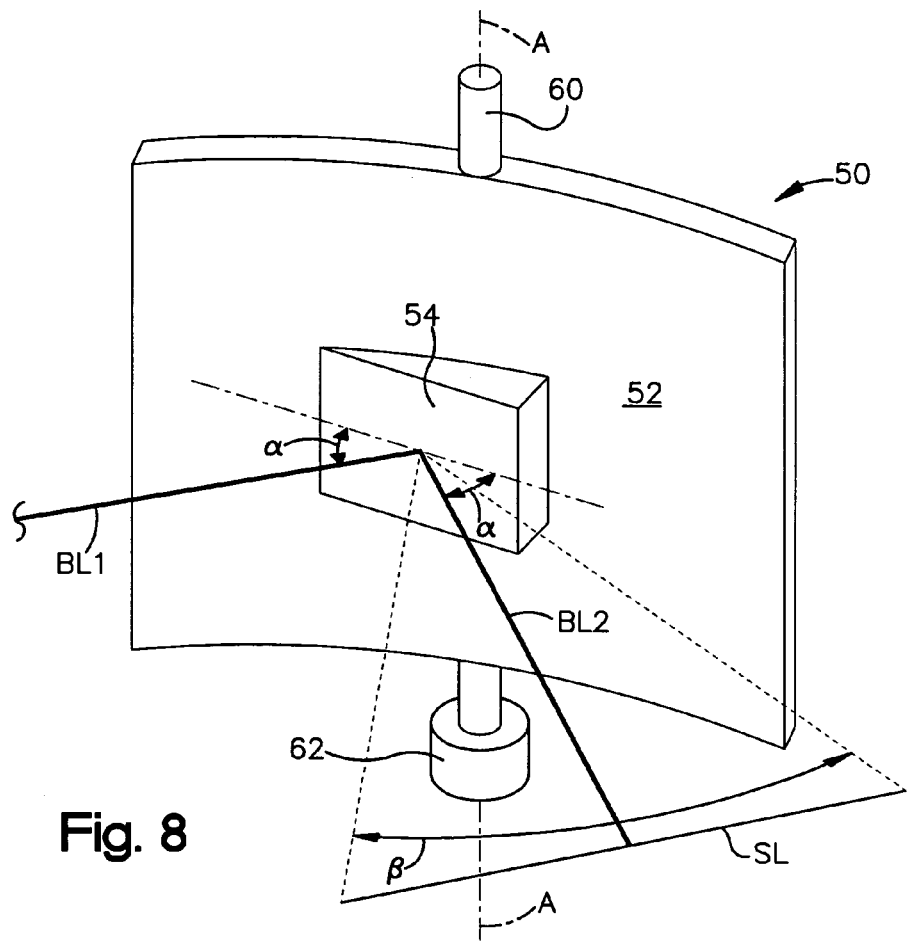
FIG. 8 is a schematic view of an oscillating retro-reflective mirror including an integral light collection mirror and a beam directing scanning mirror.
Figure 9:
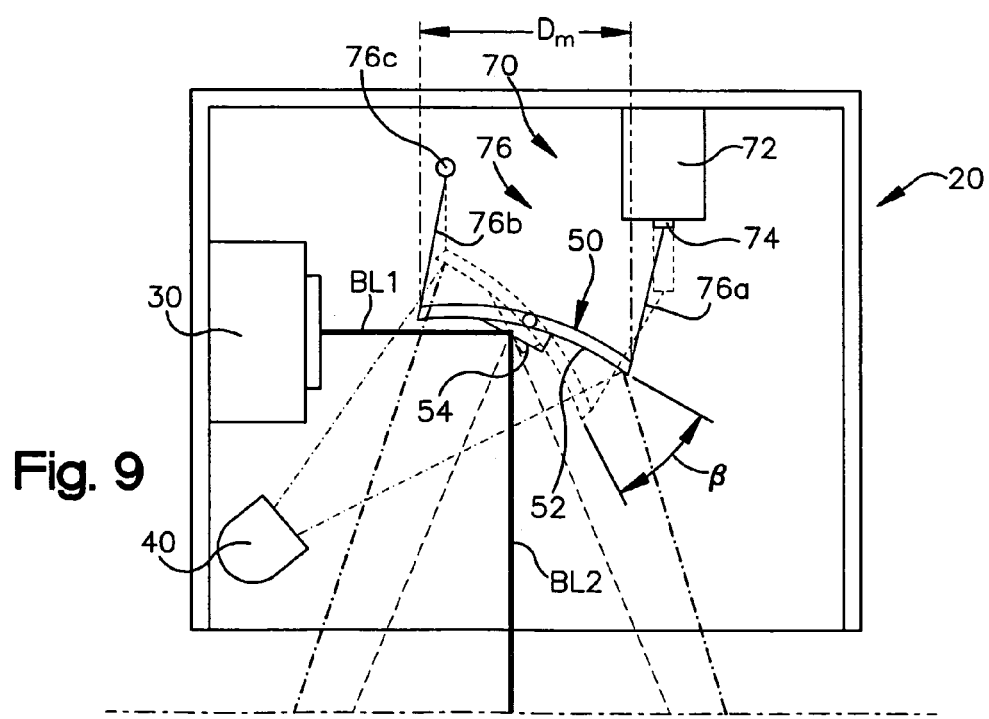
FIG. 9 is a top plan view of the scanning module showing the pivoting of the retro-reflective mirror of FIG. 8 through a scanning angle β.

It should be understood that while one suitable shape for the mirror 50 is shown in FIGS. 2 and 8, other suitable shapes (e.g., spherical, etc.) for the light collecting mirror 52 are possible. Similarly, while the shape of the beam directing mirror 54 is planar, it should be understood that other shapes such as cylindrical, spherical, toroidal, etc. depending on the need to appropriately shape the scanning beam line BL2.

The retro-reflective mirror 50 includes a pivot rod 60 which defines the pivot axis A—A. The pivot rod 60 is supported for pivotal movement in a bearing 62 affixed to the scanning module housing base 22a. The mirror 50 is oscillated by the drive mechanism 70. The drive mechanism 70 includes an electromagnetic coil 72 and a permanent magnet 74 coupled to the mirror 50 by a flexure support assembly 76. The flexure support assembly includes a pair of flexible bands 76a, 76b attached to opposite sides of the retro-reflective mirror 50. The opposite end of the band 76a is affixed to the magnet 74. The opposite end of the band 76b is attached to a post 76c. When an appropriate alternating current driving signal is applied to the coil 72 the magnet 74 repetitively moves inwardly and outwardly with respect to the coil opening. The movement of the magnet 74 inwardly into the coil 72 cause the band 76a to pull on and pivot the mirror 50 in a counterclockwise direction (as seen from the top view shown in FIG. 9). The band 76b provides a counteracting biasing force to pivot the mirror 50 in the clockwise direction (shown in dashed line in FIG. 9). The driving signal is applied to the coil 72 via the printed circuit board 24.

It should be understood that the drive mechanism 70 described herein is exemplary and one of ordinary skill in the art would understand that other types of drive mechanisms could be used to effect oscillation of the mirror 50. Suitable drive mechanism are set forth in U.S. Pat. Nos. 5,581,067, 5,367,151 6,805,295, and the aforementioned '949 patent, all of which are assigned to the assignee of the present invention and all of which are incorporated in their respective entireties by reference.

Exit Window 18

Figure 4:
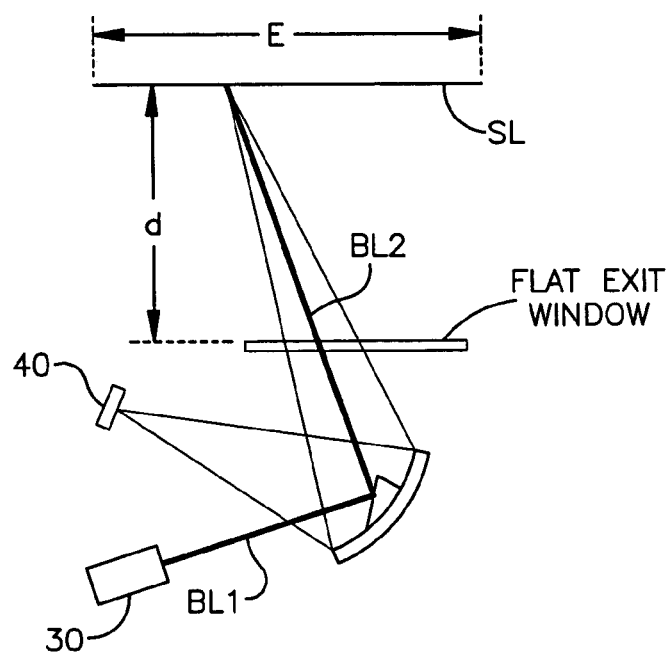
FIG. 4 is a schematic depiction of a portion of a scanner with a prior art exit window.
Figure 6:
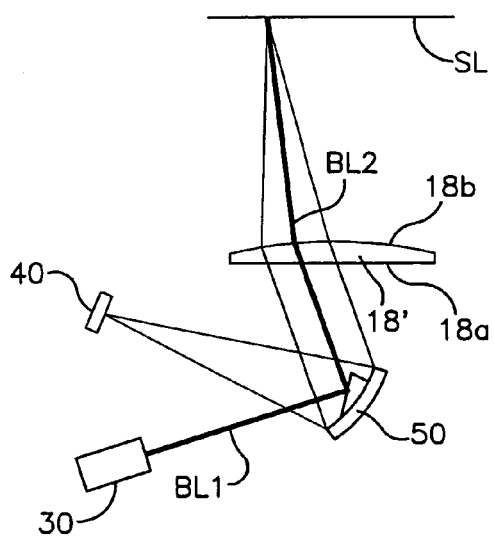
FIG. 6 is a schematic depiction of a portion of the scanner of FIG. 1 having a second preferred embodiment of an exit window lens.
Figure 7:
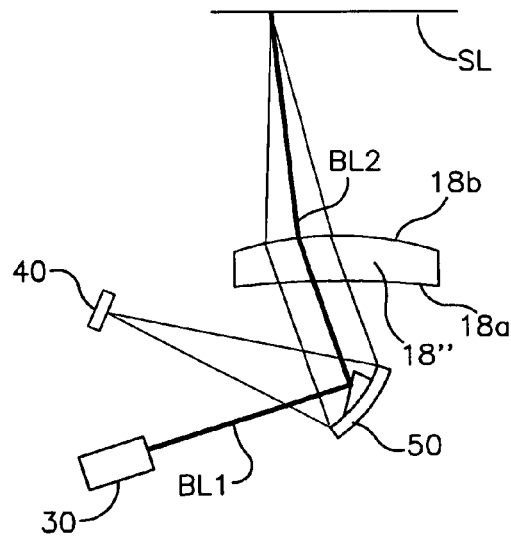
FIG. 7 is a schematic depiction of a portion of the scanner of FIG. 1 having a second preferred embodiment of an exit window lens.

A simplified prior art scanning module is shown in FIG. 4. The exit window was a flat piece of glass or transparent plastic having an optic power of zero. In the present invention, the exit window 18 has a positive optic power when viewed in the scan direction SD, that is, in the direction of the scan line SL. The optic power of the exit window 18 is a sum of the optic power of each side 18a, 18b of the window 18 when viewed in the scan direction SD. As is shown schematically in FIG. 5–7, the exit window 18 may be convex on both sides 18a, 18b of the window (shown as 18 in FIG. 5). Alternately, the exit window may be convex on one side 18b and flat on the other side 18a (shown as 18' in FIG. 6). Or, the exit window may be convex on one side 18b and concave on the other side 18a (shown as 18" in FIG. 7) provide that the sum of the optic powers of the convex and concave sides is a positive optic power.

While the optic power of the exit window 18 in the scanning plane will depend on the particular characteristics of the scanning module 20, the bar codes desired to be read, ambient light conditions and other factors. The optical power P of the exit window 18 in the scanning plane and its distance L from the light collecting mirror 52 can be chosen based on formulas involving two ratios: light collection mirror size reduction (Dm/Dc) and scan angle reduction ($\beta'/\beta$). The formulas are:

$$Dm/Dc = 1-(P \times L)$$

$$\beta'/\beta = 1-(P \times L)$$

where

Dm=the linear size of the light collecting mirror 52;

Dc=the linear size of the light collection mirror that would be used in a scanning module with an exit window having an optical power of zero;

P=optic power of the exit window in the scanning plane;

L=distance from the light collecting mirror 52 to the exit window 18 along an optical axis of the exit window 18;

$\beta$=scanning angle (as discussed above and shown in FIG. 8);

$\beta'$=perceived scanning angle after scanning beam passes through exit window 18.

The perceived scanning angle $\beta'$ is shown schematically in FIG. 1. It is the angle between a pair of rays extending from the exit window 18 to opposite ends of the length or extent E of the scan line SL. Essentially, the perceived scanning angle $\beta'$ is the effective scanning angle from the view point of the exit window 18 looking toward the target bar code 100. Since optical power P is the reciprocal of the focal length, whatever dimension or unit (e.g., meters) is used for the measurement of L, the reciprocal of that dimension (e.g., 1/meters) will be used for P. The "linear size" of the light collection mirror 52 referred to in Dm is a projection of the light collection mirror 52 along an axis that is perpendicular to the optical axis of the exit window 18 (see FIG. 9 where Dm is labeled, the optical axis would be parallel to the scanning line BL2 in FIG. 9). The linear size of Dc is measured the same way. It is interesting to the note that the factor 1−(P×L) is the same for both mirror size and scan angle reductions ratios. This factor will always be less than 1.0 because P>0.

In one embodiment, the positive optical power of the exit window 18 is only in the scan direction SD, the optical power in a direction perpendicular to the scan direction SD being zero. In an alternate embodiment, the positive optical power of the exit window 18 is in all directions, including the scan direction SD, providing even greater focusing effect. In still another alternate embodiment, the optical power of the exit window 18 is positive in the scan direction SD and a negative optical power in a direction perpendicular to the scan direction SD. The optical power in the perpendicular direction will depend on the desired shape of the scanning beam line SL2.

With a flat exit window of the prior art, the effective light collection area is substantially equal to the surface area of the light collecting mirror 52. The positive optic power exit window has the effect of focusing the reflected laser beam light received from the target bar code 100 onto the light collecting mirror 52. This focusing effect is shown schematically in FIG. 5–7. This focusing effect of the positive power exit window 18 increases the effective light collection area. The result is that a smaller light collection area, that is, a smaller light collection mirror size may be used without detrimentally affecting the scanner's ability to decode the scanned bar code. In optical terms, an entrance pupil to the light collecting mirror 52 becomes larger than the physical size of the light collecting mirror.

Due to the focusing effect of the positive optic power exit window 18, for a given scanning angle $\beta$ of rotation of the retro-reflective mirror 50, as the distance d from the nose end N of the scanner 10 increases, the length or extent E of the scan line SL become smaller. However, at the nose end N of the scanner 10, the length E of scan line SL is substantially identical for what the scan line length would be if a flat exit window (optic power zero) were used. Thus, wide target bar codes may still be read in proximity to the nose end N of the scanner 10. Additionally, there are significant advantages to utilizing a positive power exit window compared to a flat exit window resulting from the fact that a smaller sized light collection mirror 52 is required. The smaller sized light collection mirror 52 has a smaller footprint, requires less power to oscillate and resulting in less vibration.

Even if the scan angle β of the retro-reflective mirror 50 must be increased slightly to compensate for the reduction in scan line length as the distance d from the nose N of the scanner 10 increases, the advantage of a smaller light collecting mirror 52 still outweighs any disadvantages. The torque generated by oscillation of the retro-reflective mirror 50 is proportional to the first power of the scan angle β, but to the third power of the size of the mirror 50. Thus, reducing the size of the light collecting mirror 52 (and, hence, the retro-reflective mirror 50) has a net result of reducing unwanted vibration even with an increased scanning angle β.

The focusing of the scan line SL by the exit window 18 advantageously increases the brightness of the scan line. The positive optic power exit window 18 allows decreased scanning speed (i.e., the angular speed of the retro-reflective mirror 50), narrower system bandwidth, improved signal-to-noise ratio, and increased working ranges with compromising the ability to read wide bar codes.

Finally, increasing the light collection system pupil (at a given light collecting mirror size) with the positive optical power exit window 18 of the present invention advantageously reduces speckle noise. Speckle noise refers to an uneven distribution of the intensity of laser light reflected from a rough surface, due to interference of light reflected from the points with different surface height and, hence, different phase delay. Generally, the larger the size of the light collecting mirror 52, the better the capability to catch reflected light from many diffraction maxima and minima, thus assuring better averaging and less variation of measurements. The exit window 18 of the present invention reduces speckle noise without increasing the light collecting mirror size.

While the present invention has been described with a degree of particularity, it is the intent that the invention includes all modifications and alterations from the disclosed design falling with the spirit or scope of the appended claims.

We claim:

1. A portable electro-optical scanner for reading a target bar code having a plurality of bar code elements, the portable scanner comprising:
    a housing supporting a scanning module and an exit window;
    the scanning module for scanning the target bar code with a scanning beam and collecting reflected light returning from the bar code, the scanning beam and the reflected light passing through the exit window, the scanning module including:
        a beam source emitting a scanning beam;
        beam directing apparatus causing the scanning beam to be repetitively scanned along a scanning direction across the target bar code;
        photodetector circuitry; and
        a light collection mirror having a field of view that follows the scanning beam as the scanning beam moves along the scanning direction, the light collection mirror receiving reflected light from the target bar code and directing the reflected light toward the photodetector circuitry and wherein at least a portion of the exit window comprises a lens having a positive optical power with respect to the scanning direction.

2. The portable electro-optical scanner of claim 1 wherein the light collection mirror is an oscillating mirror that includes an integral beam directing mirror, the beam directing mirror positioned to intersect the scanning beam and direct the scanning beam through the exit window, oscillation of the oscillating mirror pivots the beam directing mirror causing the scanning beam to be repetitively scanned along a scanning direction across the target bar code.

3. The portable electro-optical scanner of claim 2 wherein the beam direction mirror protrudes outwardly from a central portion of the light collection mirror.

4. The portable electro-optical scanner of claim 2 wherein the oscillating mirror is fabricated of a single piece of plastic.

5. The portable electro-optical scanner of claim 1 wherein the exit window comprises a lens having a positive optical power in all directions.

6. The portable electro-optical scanner of claim 1 wherein the exit window lens has a convex surface on an outward side of the exit window facing the target bar code and a convex surface on an inward side of the exit window facing the scanning module.

7. The portable electro-optical scanner of claim 1 wherein the exit window lens has a convex surface on an outward side of the exit window facing the target bar code and a flat surface on an inward side of the exit window facing the scanning module.

8. The portable electro-optical scanner of claim 1 wherein the exit window lens has a convex surface on an outward side of the exit window facing the target bar code and a concave surface on an inward side of the exit window facing the scanning module.

9. A scanning module for use in a electro-optical scanner for scanning a target bar code with a scanning beam and collecting reflected light returning from the bar code, the scanning module comprising:
    a beam source emitting a scanning beam;
    an exit window;
    a beam directing apparatus causing the scanning beam to be directed through the exit window and repetitively scanned along a scanning direction across the target bar code;
    photodetector circuitry; and
    a light collection mirror having a field of view that follows the scanning beam as the scanning beam moves along the scanning direction, the light collection mirror receiving reflected light from the target bar code and directing the reflected light toward the photodetector circuitry and wherein at least a portion of the exit window comprises a lens having a positive optical power with respect to the scanning direction.

10. The scanning module of claim 9 wherein the light collection mirror is an oscillating mirror that includes an integral beam directing mirror, the beam directing mirror positioned to intersect the scanning beam and direct the scanning beam through the exit window, oscillation of the oscillating mirror pivots the beam directing mirror causing the scanning beam to be repetitively scanned along a scanning direction across the target bar code.

11. The scanning module of claim 10 wherein the beam directing mirror protrudes outwardly from a central portion of the light collecting mirror.

12. The scanning module of claim 10 wherein the oscillating mirror is fabricated of a single piece of plastic.

13. The scanning module of claim 9 wherein the exit window comprises a lens having a positive optical power in all directions.

14. The scanning module of claim 9 wherein the exit window lens has a convex surface on an outward side of the exit window facing the target bar code and a convex surface on an inward side of the exit window facing the scanning module.

15. The scanning module of claim 9 wherein the exit window lens has a convex surface on an outward side of the exit window facing the target bar code and a flat surface on an inward side of the exit window facing the scanning module.

16. The scanning module of claim 9 wherein the exit window lens has a convex surface on an outward side of the exit window facing the target bar code and a concave surface on an inward side of the exit window facing the scanning module.

17. A portable electro-optical scanner for reading a target bar code having a plurality of bar code elements, the portable scanner comprising:
 a housing supporting a scanning module and an exit window;
 the scanning module for scanning the target bar code with a scanning beam and collecting reflected light returning from the bar code, the scanning beam and the reflected light passing through the exit window, the scanning module including:
  a beam source emitting a scanning beam;
  beam directing apparatus causing the scanning beam to be repetitively scanned along a scanning direction across the target bar code;
  photodetector circuitry; and
  a light collection mirror having a field of view that follows the scanning beam as the scanning beam moves along the scanning direction, the light collection mirror receiving reflected light from the target bar code and directing the reflected light toward the photodetector circuitry and wherein at least a portion of the exit window comprises a lens having a positive optical power with respect to the scanning direction and wherein the exit window has a convex surface on an outward side of the exit window facing the target bar code and a selected one of a convex surface, a flat surface and a concave surface on an inward side of the exit window facing the scanning module.

18. A scanning module for use in an electro-optical scanner for scanning a target bar code with a scanning beam and collecting reflected light returning from the bar code, the scanning module comprising:
 a beam source emitting a scanning beam;
 an exit window;
 a beam directing apparatus causing the scanning beam to be directed through the exit window and repetitively scanned along a scanning direction across the target bar code;
 photodetector circuitry; and
 a light collection mirror having a field of view that follows the scanning beam as the scanning beam moves along the scanning direction, the light collection mirror receiving reflected light from the target bar code and directing the reflected light toward the photodetector circuitry and wherein at least a portion of the exit window comprises a lens having a positive optical power with respect to the scanning direction and wherein the exit window has a convex surface on an outward side of the exit window facing the target bar code and a selected one of a convex surface, a flat surface and a concave surface on an inward side of the exit window facing the scanning module.

* * * * *